United States Patent
Kim

(10) Patent No.: US 12,233,422 B2
(45) Date of Patent: Feb. 25, 2025

(54) PCR TUBE, APPARATUS FOR PCR INCLUDING THE SAME AND PCR METHOD USING THE SAME

(71) Applicant: ELECTRONICS AND TELECOMMUNICATIONS RESEARCH INSTITUTE, Daejeon (KR)

(72) Inventor: Jin Tae Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 840 days.

(21) Appl. No.: 17/470,828

(22) Filed: Sep. 9, 2021

(65) Prior Publication Data
US 2022/0288594 A1 Sep. 15, 2022

(30) Foreign Application Priority Data

Mar. 12, 2021 (KR) .......................... 10-2021-0032804

(51) Int. Cl.
*B01L 7/00* (2006.01)
(52) U.S. Cl.
CPC ......... *B01L 7/52* (2013.01); *B01L 2300/0832* (2013.01)
(58) Field of Classification Search
None
See application file for complete search history.

(56) References Cited

U.S. PATENT DOCUMENTS

| | | | |
|---|---|---|---|
| 7,329,535 B2 | 2/2008 | Oh et al. | |
| 8,735,103 B2 | 5/2014 | Chung et al. | |
| 10,344,208 B2 | 7/2019 | Vasiliev et al. | |
| 2016/0303566 A1 | 10/2016 | Lee et al. | |
| 2016/0339438 A1 * | 11/2016 | Griffin | B01L 7/525 |

FOREIGN PATENT DOCUMENTS

| | | |
|---|---|---|
| KR | 10-2003-0038246 A | 5/2003 |
| KR | 10-2010-0008476 A | 1/2010 |

OTHER PUBLICATIONS

Debjan Pal et al., "A power-efficient thermocycler based on induction heating for DNA amplification by polymerase chain reaction", Indian Institute of Science, Review of Scientific Instruments 75,2880, 2004.
Geoffrey Mulberry et al., "3D printing and milling a real-time PCR device for infectious disease diagnostics", University of Central Florida, PLoS ONE 12(6), 2017.

* cited by examiner

*Primary Examiner* — Samuel C Woolwine

(57) ABSTRACT

Provided is a PCR tube including: an outer tube configured to provide a first space having a blocked lower portion; and an inner tube inserted to the first space. Here, the inner tube includes: an inner tube body configured to provide a second space; and a spiral structure protruding from a side surface of the inner tube body to the outside of the inner tube body, and a micro-channel is defined by the outer tube, the inner tube body, and the spiral structure in a state in which the inner tube is inserted into the first space.

15 Claims, 8 Drawing Sheets

FIG. 1
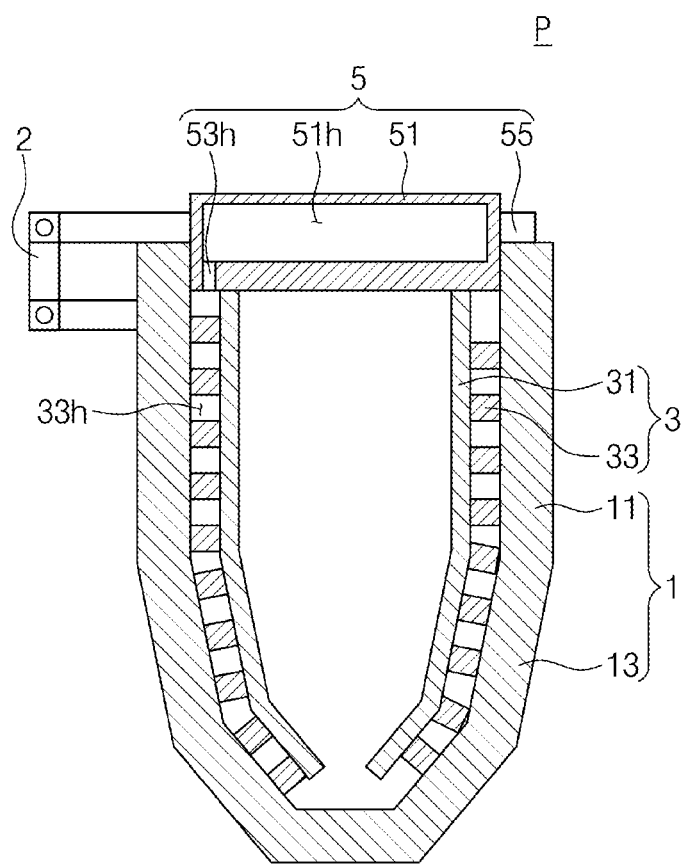
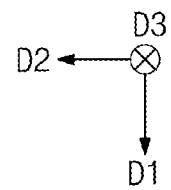

PCR TUBE, APPARATUS FOR PCR INCLUDING THE SAME AND PCR METHOD USING THE SAME

CROSS-REFERENCE TO RELATED APPLICATIONS

This U.S. non-provisional patent application claims priority under 35 U.S.C. § 119 of Korean Patent Application No. 10-2021-0032804, filed on Mar. 12, 2021, the entire contents of which are hereby incorporated by reference.

BACKGROUND

The present disclosure herein relates to a PCR tube, an apparatus for PCR including the same, and a PCR method using the same, and more particularly to a PCR tube capable of effectively performing DNA amplification, an apparatus for PCR including the same, and a PCR method using the same.

The polymerase chain reaction (PCR) is a molecular biology technology of copying and amplifying a wanted fragment of DNA and invented by K. B. Mullis in 1983. By using the PCR, a small amount of genetic material may be amplified to obtain a large amount of genetic material having the same DNA sequence. Thus, various kinds of genetic disorders or various infectious diseases caused by bacteria, viruses, and fungi may be diagnosed by detecting human DNA.

The PCR may include three processes. More specifically, the PCR may include a thermal denaturation process, an annealing process, and a polymerization (or extension) reaction process. In the thermal denaturation process, two strands of DNA may be separated by using heat. In the annealing process, the primer may be annealed to the end of the sequence to be amplified. In the polymerization reaction process, DNA may be synthesized by heating again.

Each of the processes may be performed with a predetermined temperature range. Thus, a temperature of a sample containing the DNA may be varied with three temperature ranges. To this end, a heater for heating the sample may be used.

SUMMARY

The present disclosure provides a PCR tube capable of precisely controlling a temperature of a sample, an apparatus for PCR including the same, and a PCR method using the same.

The present disclosure also provides a PCR tube having an overall simplified configuration, an apparatus for PCR including the same, and a PCR method using the same.

The present disclosure also provides a PCR tube capable of performing fluorescence measurement without transferring the tube, an apparatus for PCR including the same, and a PCR method using the same.

The present disclosure provides a PCR tube capable of improving an efficiency of DNA amplification, an apparatus for PCR including the same, and a PCR method using the same.

The object of the present invention is not limited to the aforesaid, but other objects not described herein will be clearly understood by those skilled in the art from descriptions below.

An embodiment of the inventive concept provides a PCR tube including: an outer tube configured to provide a first space having a blocked lower portion; and an inner tube inserted to the first space. Here, the inner tube includes: an inner tube body configured to provide a second space; and a spiral structure protruding from a side surface of the inner tube body to the outside of the inner tube body, and a micro-channel is defined by the outer tube, the inner tube body, and the spiral structure in a state in which the inner tube is inserted into the first space.

In an embodiment, as a lower portion of the inner tube body is opened, the first space and the second space may be connected at the lower portion of the inner tube body.

In an embodiment, the PCR tube may further include a lid coupled onto the outer tube, and the lid may include: a sample channel; and an injection hole extending downward from the sample channel.

In an embodiment, each of the outer tube and the inner tube body may have a shape that gradually decreases in a downward direction.

In an embodiment, the spiral structure may protrude by about 150 μm to about 250 μm from the side surface of the inner tube body to the outside of the inner tube body.

In an embodiment of the inventive concept, an apparatus for PCR includes: a heater configure to provide a through-hole that vertically extends; and a PCR tube inserted to the through-hole. The heater includes a first heater, a second heater, and a third heater, and the first heater, the second heater, and the third heater are arranged along a circumferential direction of the heater with respect to the through-hole. Here, the PCR tube includes: an outer tube; and an inner tube disposed inside the outer tube, and a micro-channel extends downward with a spiral shape between the outer tube and the inner tube.

In an embodiment, the PCR tube may have a vertical length greater than that of the through-hole.

In an embodiment, the apparatus may further include: a body tube configured to provide an observation space that vertically extends; a light source configured to irradiate light to the observation space; and a light detection part. The body tube may further provide an observation hole that horizontally extends to be connected with the observation space, the light detection part may detect light emitted from the observation space through the observation hole, and when the heater is seated on the body tube, a lower end of the PCR tube may be inserted into the observation space.

In an embodiment, the apparatus may further include: a lens disposed in the observation space; and an optical filter disposed in the observation hole.

In an embodiment, the inner tube may include: an inner tube body; and a spiral structure protruding from a side surface of the inner tube body to the outside of the inner tube body, and the micro-channel may be defined by the outer tube, the inner tube body, and the spiral structure.

In an embodiment, each of the outer tube and the inner tube body may have a shape that gradually decreases in a downward direction.

In an embodiment of the inventive concept, a PCR method includes: filling a sample in a sample channel of a PCR tube; allowing a sample to flow from the sample channel toward a micro-channel of the PCR tube; and controlling a temperature of a heater that surrounds the PCR tube. Here, the micro-channel extends downward with a spiral shape, the heater includes a first heater, a second heater, and a third heater, the first heater, the second heater, and the third heater are arranged in a circumferential direction of the heater with respect to the PCR tube, and the controlling of the temperature of the heater that surrounds the PCR tube includes: controlling the first heater to have a first temperature; controlling the second heater to have a second temperature; and controlling the third heater to have a third temperature.

In an embodiment, the PCR method may further include allowing the PCR tube to rotate, and the allowing of the PCR tube to rotate may further include returning the sample flown downward along the micro-channel to the sample channel.

In an embodiment, the PCR method may further include measuring fluorescence of the sample flown downward along the micro-channel.

In an embodiment, the measuring of the fluorescence of the sample flown downward along the micro-channel may further include: irradiating light to the sample flown downward along the micro-channel; and detecting light emitted from the sample.

Particularities of other embodiments are included in the detailed description and drawings.

BRIEF DESCRIPTION OF THE FIGURES

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings:

FIG. 1 is a cross-sectional view illustrating a PCR tube according to an embodiment of the inventive concept;

DETAILED DESCRIPTION

Figure 2:
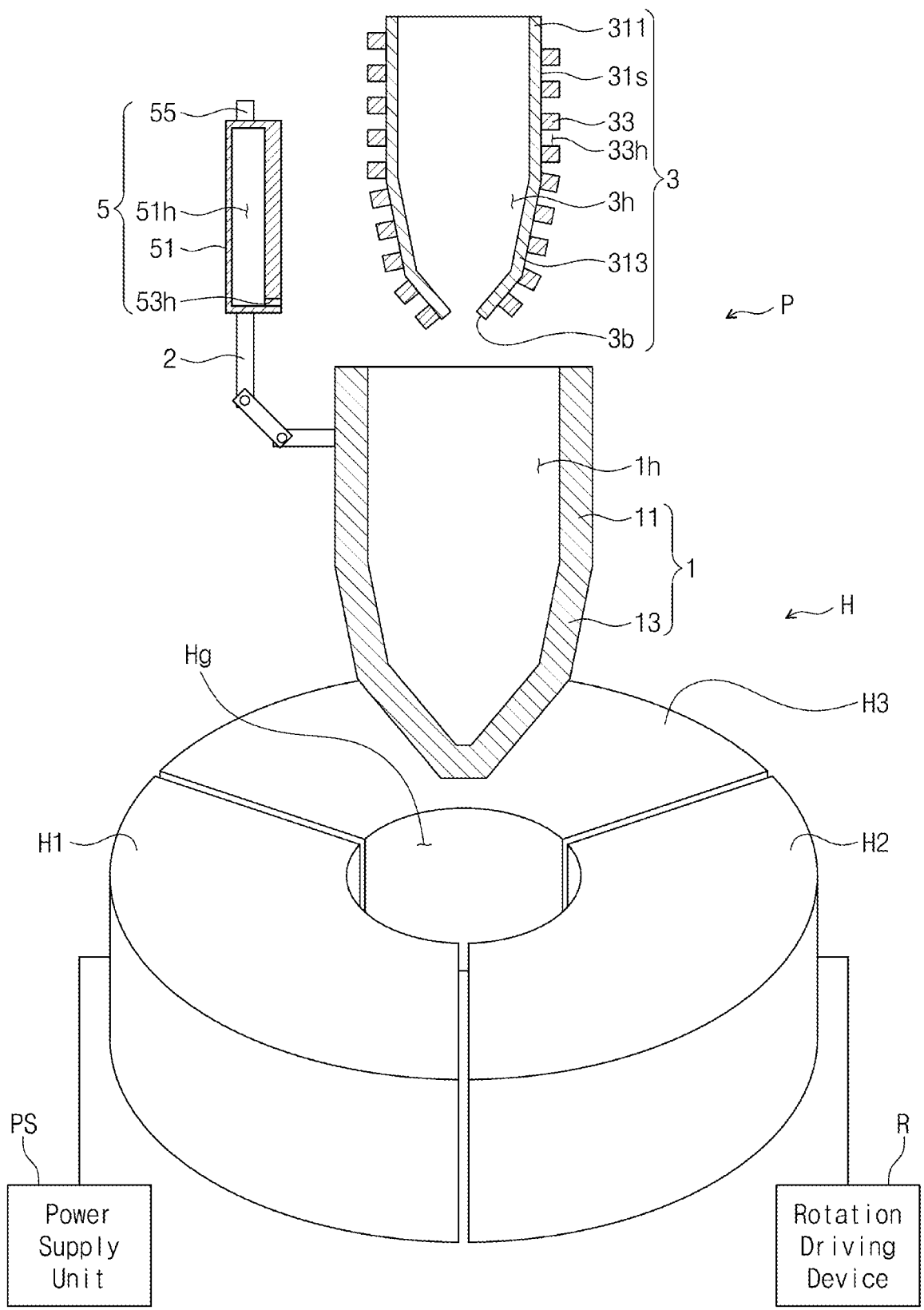
FIG. 2 is an exploded view illustrating an apparatus for PCR according to an embodiment of the inventive concept.

Exemplary embodiments of the present invention will be described with reference to the accompanying drawings so as to sufficiently understand constitutions and effects of the present invention. The technical ideas of the inventive concept may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims.

Like reference numerals refer to like elements throughout. The embodiment in the detailed description will be described with reference to block diagrams, perspective views and/or cross-sectional views as ideal exemplary views of the present invention. Also, in the figures, the dimensions of layers and regions are exaggerated for clarity of illustration. Areas exemplified in the drawings have general properties, and are used to illustrate a specific shape of a semiconductor package region. Thus, this should not be construed as limited to the scope of the present invention. Also, although various terms are used to describe various components in various embodiments of the inventive concept, the component are not limited to these terms. These terms are only used to distinguish one component from another component. Embodiments described and exemplified herein include complementary embodiments thereof.

In the specification, the technical terms are used only for explaining a specific exemplary embodiment while not limiting the present invention. The terms of a singular form may include plural forms unless referred to the contrary. The meaning of "include," "comprise," "including," or "comprising," specifies a property, a region, a fixed number, a step, a process, an element and/or a component but does not exclude other properties, regions, fixed numbers, steps, processes, elements and/or components.

Hereinafter, the present invention will be described in detail by explaining preferred embodiments of the invention with reference to the attached drawings.

FIG. 1 is a cross-sectional view illustrating a polymerase chain reaction (PCR) tube according to an embodiment of the inventive concept, and FIG. 2 is an exploded view illustrating an apparatus for PCR (hereinafter, referred to as a PCR apparatus) according to an embodiment of the inventive concept.

Hereinafter, in FIG. 1, D1 may be referred to as a first direction, D2 crossing the first direction D1 may be referred to as a second direction, and D3 crossing the first direction D1 and the second direction D2 may be referred to as a third direction.

Referring to FIGS. 1 and 2, a PCR apparatus A may be provided. The PCR apparatus A may represent an apparatus capable of performing a PCR method for amplifying DNA. The PCR apparatus A may include a PCR tube P, a heater H, a power supply unit PS, a rotation driving device R, and a fluorescence measuring device (refer to FIG. 10).

The PCR tube P may provide a space in which a sample is filled. The sample may be heated and varied in the PCR tube P. The PCR tube P may include an outer tube 1, an inner tube 3, a lid 5, and a connection member 2.

The outer tube 1 may provide a first space 1h. The first space 1h may extend in the first direction D1. The outer tube 1 may have a blocked lower portion. Thus, a lower portion of the first space 1h may be blocked. The outer tube 1 may have a shape that gradually decreases in a downward direction. That is, the outer tube 1 may have a diameter that gradually decreases in the first direction D1. For example, the outer tube 1 may include a first portion 11 and a second portion 13. The first portion 11 may have a constant diameter. The second portion 13 may have a diameter that gradually decreases in the downward direction. However, the embodiment of the inventive concept is not limited thereto. For example, the outer tube 1 may have a diameter that gradually decreases in the downward direction. The outer tube 1 may include a transparent material. Thus, observation light and fluorescence may pass through the outer tube 1.

The inner tube 3 may be inserted into the outer tube 1. That is, the inner tube 3 may be inserted into a first space 1*h*. The inner tube 3 may include an inner tube body 31 and a spiral structure 33. The inner tube body 31 may extend in the first direction D1. The inner tube body 31 may provide a second space 3*h*. The inner tube body 31 may have an opened lower portion. That is, all of upper and lower portions of the second space 3*h* may be opened. Thus, the first space 1*h* and the second space 3*h* may be connected at a lower portion 3*b* of the inner tube body 31 in the state in which the inner tube 3 is inserted into the outer tube 1. The inner tube body 31 may have a shape that gradually decreases in the downward direction. That is, the inner tube body 31 may have a diameter that gradually decreases in the first direction D1. For example, the inner tube body 31 may include a first portion 311 and a second portion 313. The first portion 311 may have a constant diameter. The second portion 313 may have a diameter that gradually decreases in the downward direction. However, the embodiment of the inventive concept is not limited thereto. For example, the inner tube body 31 may have a diameter that gradually decreases in the downward direction. The spiral structure 33 may be coupled to a side surface 31*s* of the inner tube body 31. More specifically, the spiral structure 33 may protrude by a predetermined length from the side surface 31*s* of the inner tube body 31 to the outside of the of the inner tube body 31. An outside direction of the inner tube body 31 may represent a direction away from the second space 3*h*. The spiral structure 33 may include a spiral shape. That is, the spiral structure 33 may represent a three-dimensional spiral shape that surrounds the inner tube body 31. The spiral structure 33 may extend with the spiral shape from an upper side of the inner tube body 31 in the first direction D1. A micro-channel 33*h* may be defined between the spiral structures 33. More specifically, the micro-channel 33*h* may be defined by the side surface 31*s* of the inner tube body 31, the spiral structure 33, and an inner surface of the outer tube 1 in a state in which the inner tube 3 is inserted into the first space 1*h* of the outer tube 1. Since the spiral structure 33 extends with the spiral shape in the first direction D1, the micro-channel 33*h* may also extend with the spiral shape in the downward direction. The micro-channel 33*h* may have a width of about 150 μm to about 250 μm. More specifically, the spiral structure 33 may protrude by about 150 μm to about 250 μm from the side surface 31*s* of the inner tube body 31 to the outside of the of the inner tube body 31. The micro-channel 33*h* may be connected to the first space 1*h* and the second space 3*h* at a lower end of a plasma separation tube B in a state in which the inner tube 3 is inserted into the first space 1*h*.

The lid 5 may be selectively coupled onto the outer tube 1. The lid 5 may include a lid body 51 and a stopper 55. The lid body 51 may be coupled onto the outer tube 1 and separate the first space 1*h* from the outside. The lid body 51 may provide a sample channel 51*h* and an injection hole 53*h*. The sample channel 51*h* may represent a space defined in the lid body 51. The sample channel 51*h* may be filled with a sample that requires DNA amplification. A detailed description regarding this will be described later. The injection hole 53*h* may extend from the sample channel 51*h* in the downward direction. The injection hole 53*h* may connect the sample channel 51*h* with the micro-channel 33*h*. More specifically, when the lid 5 is coupled to an upper end of the outer tube 1 in the state in which the inner tube 3 is inserted into the outer tube 1, the sample channel 51*h* and an upper side of the micro-channel 33*h* may be connected by the injection hole 53*h*. The stopper 55 may be coupled to an outer side of the lid body 51. The stopper 55 may support the lid body 51 so that the lid body 51 is fixed at a predetermined position on the outer tube 1. That is, when the lid 5 is coupled onto the outer tube 1, the stopper 55 may stop the lid body 51 so that the lid body 51 is fixed at a proper position instead of falling into the first space 1*h*. When the lid 5 is coupled onto the outer tube 1 in the state in which the inner tube 3 is inserted into the outer tube 1 in the state in which the inner tube 3 is inserted into the outer tube 1, a bottom surface of the lid 5 may contact an upper end of the inner tube 3. Thus, the lid 5 may press the inner tube 3 in the downward direction to firmly fix the inner tube 3 at a predetermined position.

The connection member 2 may connect the lid 5 with the outer tube 1. As illustrated in FIGS. 1 and 2, although the connection member 2 may include a poly-articulated arm, the embodiment of the inventive concept is not limited thereto. That is, the connection member 2 may include a strap made of a flexible material.

The heater H may provide a through-hole Hg. The heater H may have an overall cylindrical shape. The PCR tube P may be inserted to the through-hole Hg. The through-hole Hg may have a vertical length less than that of the PCR tube P. That is, a length in the first direction D1 of the PCR tube P may be greater than that in the first direction D1 of the through-hole Hg. Thus, an upper side and/or a lower side of the PCR tube P may protrude to the outside of the through-hole Hg in a state in which the PCR tube P is inserted to the through-hole Hg. The heater H may be connected to the power supply unit Ps and the rotation driving device R. The heater H may receive a power from the power supply unit PS. The heater H may emit heat by using the power supplied from the power supply unit PS. The PCR tube P inserted to the through-hole Hg may be heated by the heat emitted from the heater H. The heater H may include a first heater H1, a second heater H2, and a third heater H3. The first heater H1, the second heater H2, and the third heater H3 may be arranged along a circumferential direction with respect to the through-hole Hg. For example, the heater H having the cylindrical shape may be divided into three pieces of the first heater H1, the second heater H2, and the third heater H3. A central angle of each of the first heater H1, the second heater H2, and the third heater H3 may be about 120°. Thus, the first heater H1, the second heater H2, and the third heater H3 may have the same size as each other. However, the embodiment of the inventive concept is not limited thereto. For example, the size of each of the first heater H1, the second heater H2, and the third heater H3 may be varied according to a specific design application. In embodiments, the first heater H1, the second heater H2, and the third heater H3 may be spaced apart from each other. That is, the first heater H1, the second heater H2, and the third heater H3 may be horizontally spaced apart from each other to separately control a temperature of each of the first heater H1, the second heater H2, and the third heater H3. Alternatively, an insulating material may be inserted between the first heater H1, the second heater H2, and the third heater H3. However, the embodiment of the inventive concept is not limited thereto. For example, the size of each of the first heater H1, the second heater H2, and the third heater H3 may contact each other.

The power supply unit PS may be connected to the heater H. The power supply unit PS may supply a power to the heater H to heat the heater H. More specifically, the power supply unit PS may control each of the first heater H1, the second heater H2, and the third heater H3 to have a different temperature. A detailed description regarding this will be described later.

The rotation driving device R may be connected to the heater H. The rotation driving device R may supply a rotation power to the heater H. To this end, the rotation driving device R may include a motor. The heater H may rotate around an axis parallel to the first direction D1 by the power supplied by the rotation driving device R. Thus, the PCR tube P inserted to the through-hole Hg may also rotate around the axis parallel to the first direction D1.

The fluorescence measuring device will be described later with reference to FIG. 10.

Figure 3:
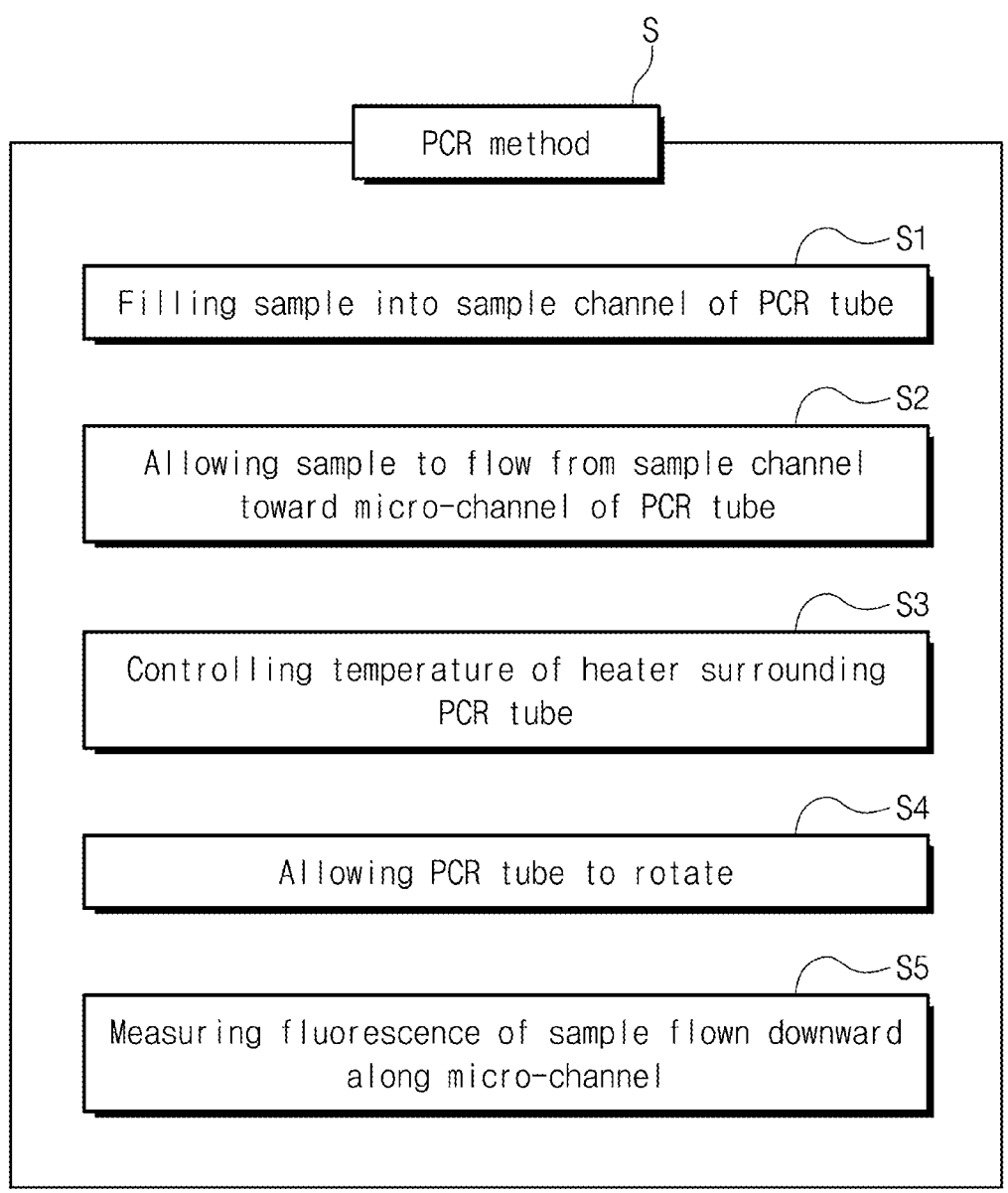
FIG. 3 is a flowchart representing a PCR method according to an embodiment of the inventive concept.

FIG. 3 is a flowchart representing a PCR method according to an embodiment of the inventive concept.

Referring to FIG. 3, a PCR method S may be provided. According to the PCR method S, DNA in a sample may be amplified by using the PCR apparatus (refer to FIG. 2). The PCR method S may include: a process S1 of filling the sample in the sample channel of the PCR tube; a process S2 of allowing the sample to flow from the sample channel toward the micro-channel of the PCR tube; a process S3 of controlling a temperature of the heater surrounding the PCR tube; a process S4 of allowing the PCR tube to rotate; and a process S5 of measuring fluorescence of the sample flown along the micro-channel.

Hereinafter, each of the processes of the PCR method S of FIG. 3 will be described in detail with reference to FIGS. 4 to 11.

Figure 4:
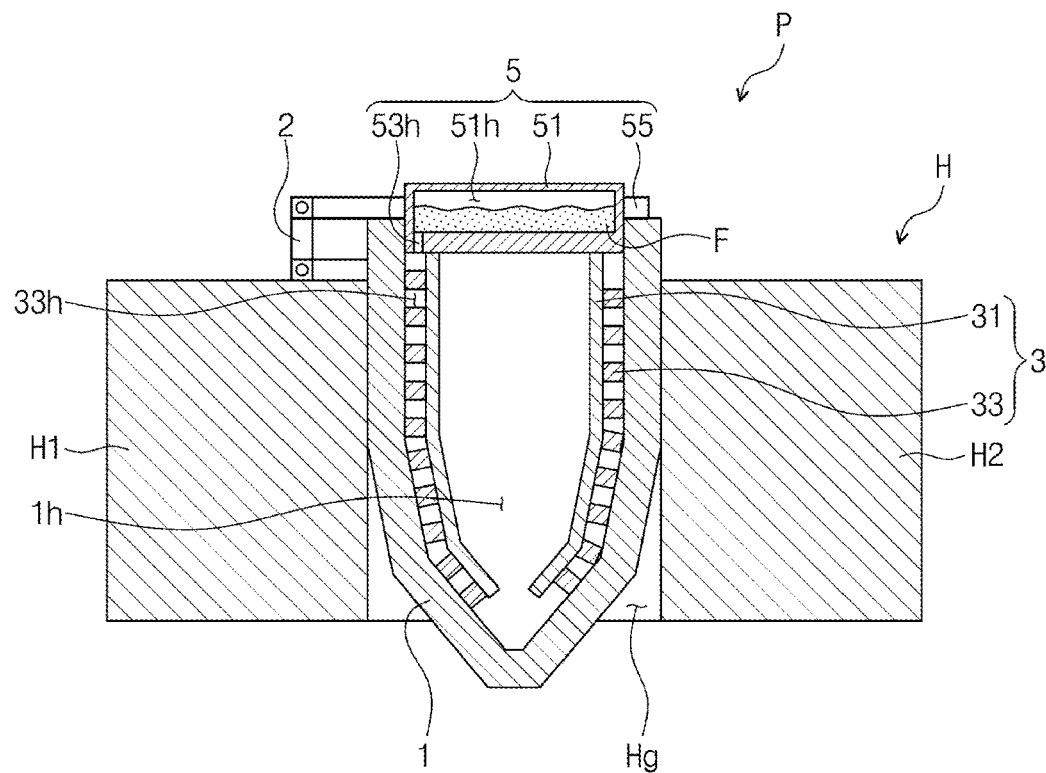
FIG. 4 is a cross-sectional view illustrating a state in which a sample is filled in a sample channel of the apparatus for PCR according to an embodiment of the inventive concept.

FIG. 4 is a cross-sectional view illustrating a state in which the sample is filled in the sample channel of the PCR apparatus according to an embodiment of the inventive concept.

Referring to FIGS. 4 and 3, the process S1 of filling the sample in the sample channel of the PCR tube may include a process of filling a sample F to be inspected into the sample channel 51*h*. The second space 3*h* (refer to FIG. 2) of the inner tube 3 may overlap the first space 1*h* (refer to FIG. 1) of the outer tube 1 in the state in which the inner tube 3 is inserted into the outer tube 1. Thus, hereinafter, the corresponding space in the state in which the inner tube 3 is inserted into the outer tube 1 may be referred to as the first space 1*h*. The sample F to be inspected may represent a sample including DNA and primer, which is necessary to be amplified by the PCR method. For example, the sample F may include human blood that is necessary to be checked whether a specific virus exists. However, the embodiment of the inventive concept is not limited thereto. For example, the sample F may include another liquid that requires DNA amplification. Although not shown, the sample F may be injected into the sample channel 51*h* through the injection hole 53*h* in a state in which the lid 5 is separated from the outer tube 1. However, the embodiment of the inventive concept is not limited thereto. For example, the sample F may be injected into the sample channel 51*h* by using a different method.

Figure 5:
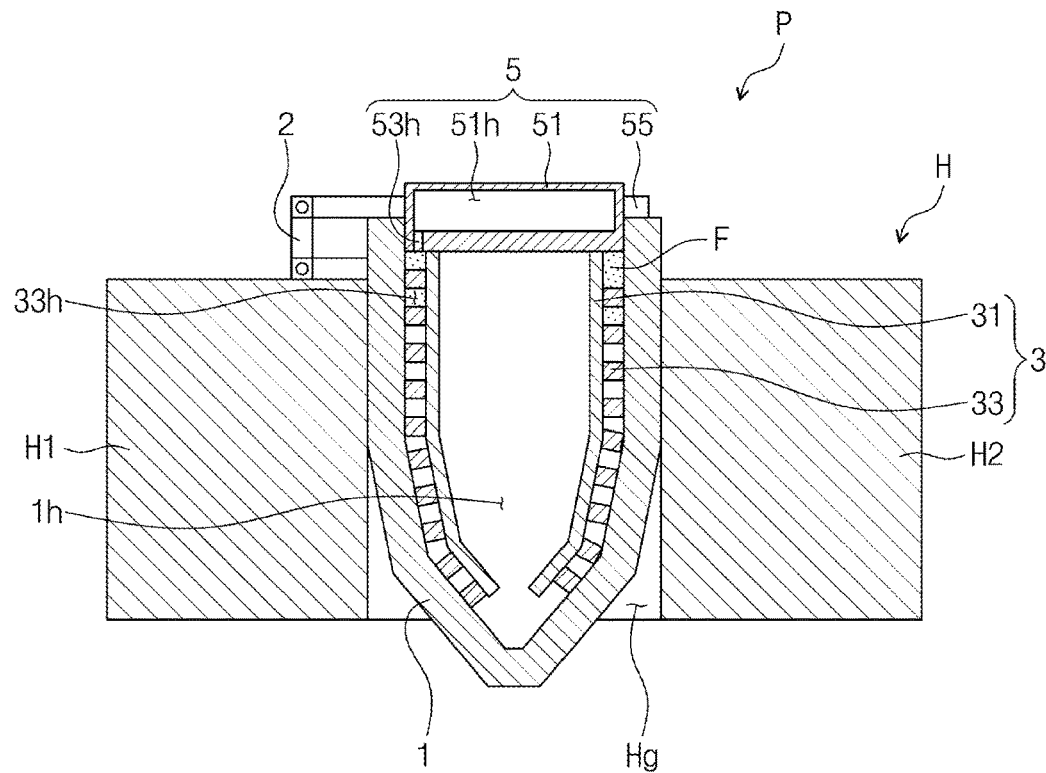
FIGS. 5 and 6 are cross-sectional views illustrating a state in which the sample in the sample channel flows along a micro-channel in the apparatus for PCR according to an embodiment of the inventive concept.
Figure 6:
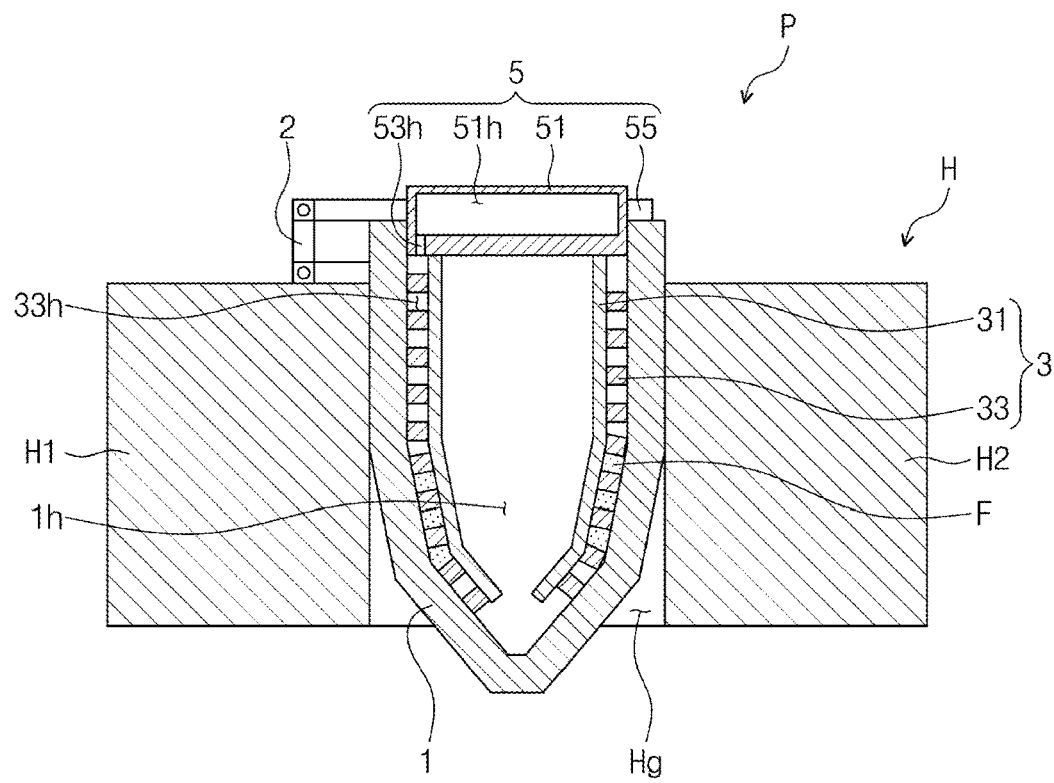

FIGS. 5 and 6 are cross-sectional views illustrating a state in which the sample in the sample channel flows along the micro-channel in the PCR apparatus according to an embodiment of the inventive concept.

Referring to FIGS. 5, 6, and 3, the process S2 of allowing the sample to flow from the sample channel toward the micro-channel of the PCR tube may include a process of allowing the sample F in the sample channel 51*h* to flow along the micro-channel 33*h* by gravity. The sample F may flow into the micro-channel 33*h* through the injection hole 53*h* and then flow downward while rotating along the micro-channel 33*h*.

The process S3 of controlling the temperature of the heater surrounding the PCR tube may include a process of differently controlling a temperature of each of the first heater H1, the second heater H2, and the third heater H3 (refer to FIG. 2). The first heater H1 may be controlled to a first temperature. Thus, a material disposed around the first heater H1 may have a temperature similar to the first temperature. The second heater H2 may be controlled to a second temperature, and a material disposed around the second heater H2 may have a temperature similar to the second temperature. The third heater H3 may be controlled to a third temperature, and a material disposed around the third heater H3 may have a temperature similar to the third temperature. The first temperature may be higher than each of the second temperature and the third temperature. The second temperature may be lower than the third temperature. For example, the first temperature may be about 94°. The second temperature may be about 55°. The third temperature may be about 72°. However, the embodiment of the inventive concept is not limited to the numerical values. For example, the temperature range may be adjusted according to the kind of DNA that requires amplification and a specific design application.

The sample F may be heated by the heater H while moving downward and rotating along the micro-channel 33*h*. For example, when the sample F passes a portion adjacent to the first heater H1, the sample F may be heated to have a temperature similar to the first temperature. When the sample F continuously rotates along the micro-channel 33*h* and passes a portion adjacent to the second heater H2, the sample F may be heated to have a temperature similar to the second temperature. When the sample F continuously rotates along the micro-channel 33*h* and passes a portion adjacent to the third heater H3, the sample F may be heated to have a temperature similar to the third temperature. When the temperature of the sample F approaches the first temperature, double helix of DNA in the sample F is temporarily unwound into DNA template strands. That is, the DNA in the sample F may undergo thermal denaturation. When the temperature of the sample F approaches the first temperature, the primer may be annealed to the DNA in the sample F, in which the double helix is unwound into one strand. That is, the DNA in the sample F may undergo an annealing process. When the temperature of the sample F approaches the third temperature, polymerase in the DNA to which the primer is annealed in the sample F may synthesize DNA. That is, the DNA in the sample F may undergo a polymerization (or extension) reaction process. The DNA in the sample F may be doubled through the above-described process.

The sample F may be repeatedly heated by the first heater H1, the second heater H2, and the third heater H3 while rotating along the micro-channel 33*h* having the spiral structure. That is, the temperature of the sample F becomes the first temperature by the first heater H1 and then becomes the second temperature by the second heater H2. Thereafter, the temperature of the sample F becomes the third temperature by the third heater H3 and then becomes the first temperature again as the sample F is away from the third heater H3 and close to the first heater H1. Thereafter, the temperature of the sample F may repeatedly experience the first temperature, the second temperature, and the third temperature through continuously repeated processes. Thus, the amplification of the DNA in the sample F may be repeatedly performed.

Figure 7:
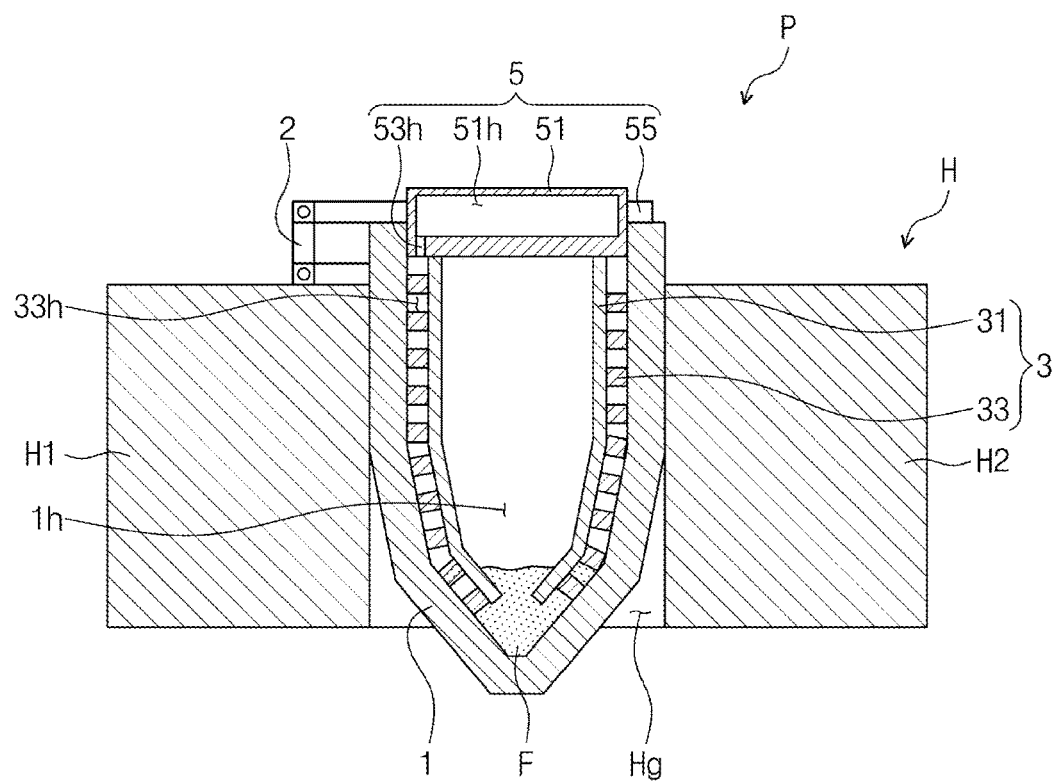
FIG. 7 is a cross-sectional view illustrating a state in which the sample is gathered at a lower side of the tube in the apparatus for PCR according to an embodiment of the inventive concept.

FIG. 7 is a cross-sectional view illustrating a state in which the sample is gathered at a lower side of the tube in the PCR apparatus according to an embodiment of the inventive concept.

Referring to FIG. 7, a portion or a whole of the sample F may move out from the micro-channel 33$h$ and be gathered at a lower end of the PCR tube P. That is, the sample F may be stagnated at a lower end of the first space 1$h$. As the sample F is heated while passing through the micro-channel 33$h$, the DNA in the sample F may be repeatedly amplified. Thus, an amount of the DNA in the sample F may remarkably increase more than that before the amplification. The fluorescence measurement may be performed on the above-described sample F. This will be described later with reference to FIGS. 10 and 11. Alternatively, when it is determined that the amplification of the DNA is not sufficiently performed, the amplification of the DNA may be repeated. Hereinafter, a method for repeating the amplification of the DNA in the sample F will be described with reference to FIGS. 8 and 9.

Figure 8:
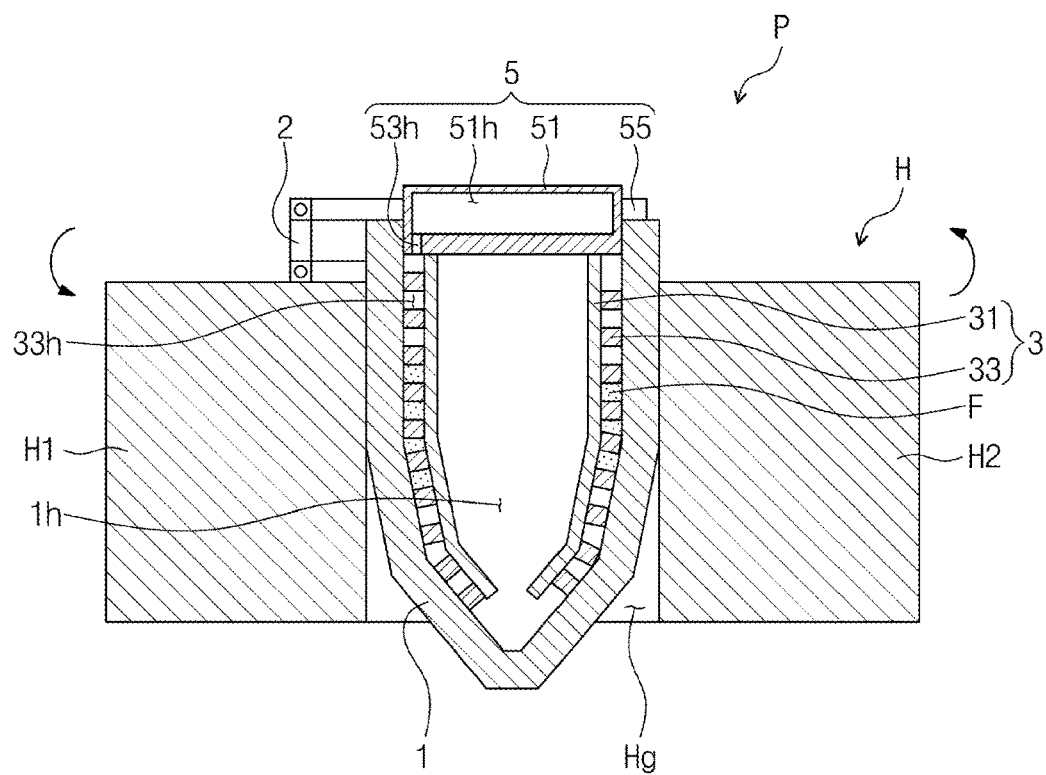
FIG. 8 is a cross-sectional view illustrating a state of allowing the PCR tube to rotate according to an embodiment of the inventive concept.

FIG. 8 is a cross-sectional view illustrating a state of allowing the PCR tube to rotate according to an embodiment of the inventive concept.

Referring to FIGS. 8 and 3, the process S4 of rotation the PCR tube may include a process of allowing the heater H to rotate by the rotation driving device R (refer to FIG. 2). When the heater H rotates, the PCR tube P in the through-hole Hg may also rotate. As the PCR tube P rotates, the sample F may move upward again along the micro-channel 33$h$. That is, the sample F may move upward along the micro-channel 33$h$ having the spiral structure by a centrifugal force generated as the sample F rotates.

Figure 9:
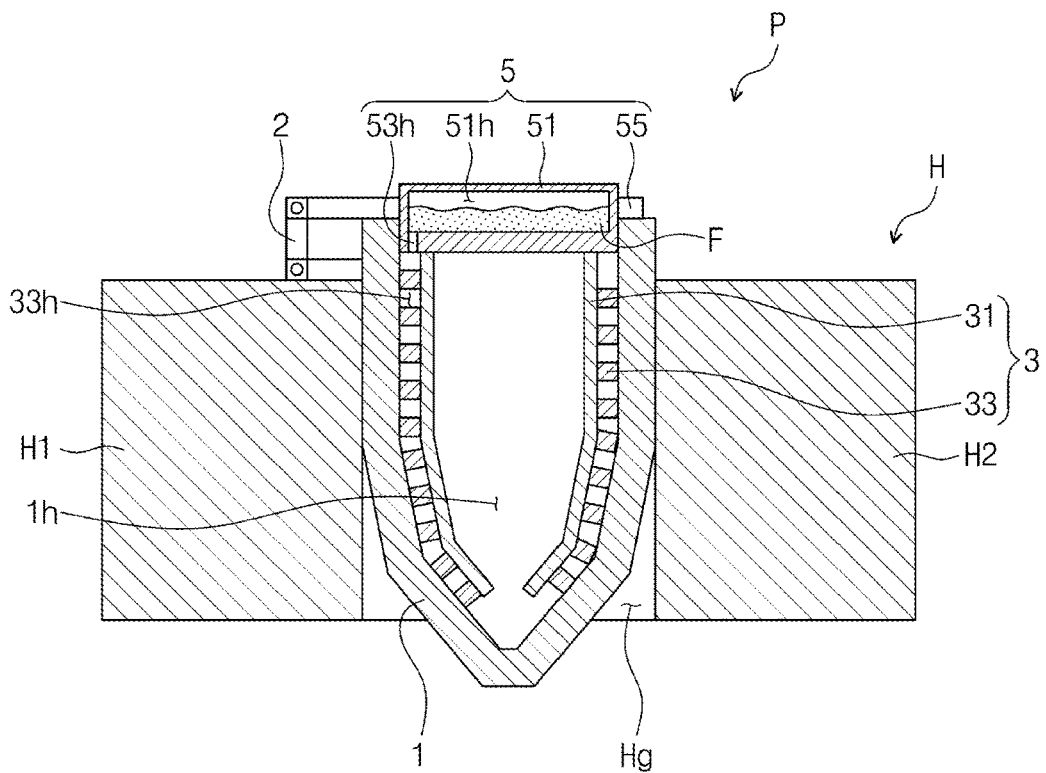
FIG. 9 is a cross-sectional view illustrating a state in which the sample is returned to the sample channel as the PCR tube rotates in the PCR apparatus according to an embodiment of the inventive concept.

FIG. 9 is a cross-sectional view illustrating a state in which the sample is returned to the sample channel as the PCR tube rotate in the PCR apparatus according to an embodiment of the inventive concept.

Referring to FIG. 9, the sample F may move upward again to the sample channel 51$h$ by the rotation of the PCR tube P. That is, the sample F may move out from the micro-channel 33$h$ and enter into the sample channel 51$h$ through the injection hole 53$h$. Thereafter, the DNA amplification may be repeated as described with reference to FIGS. 4 to 7.

When it is determined that the amplification is sufficiently repeated, the DNA amplification may be stopped. The fluorescence measurement may be performed on the sample F containing the amplified DNA. Hereinafter, the fluorescence measurement will be described in detail with reference to FIGS. 10 and 11.

Figure 10:
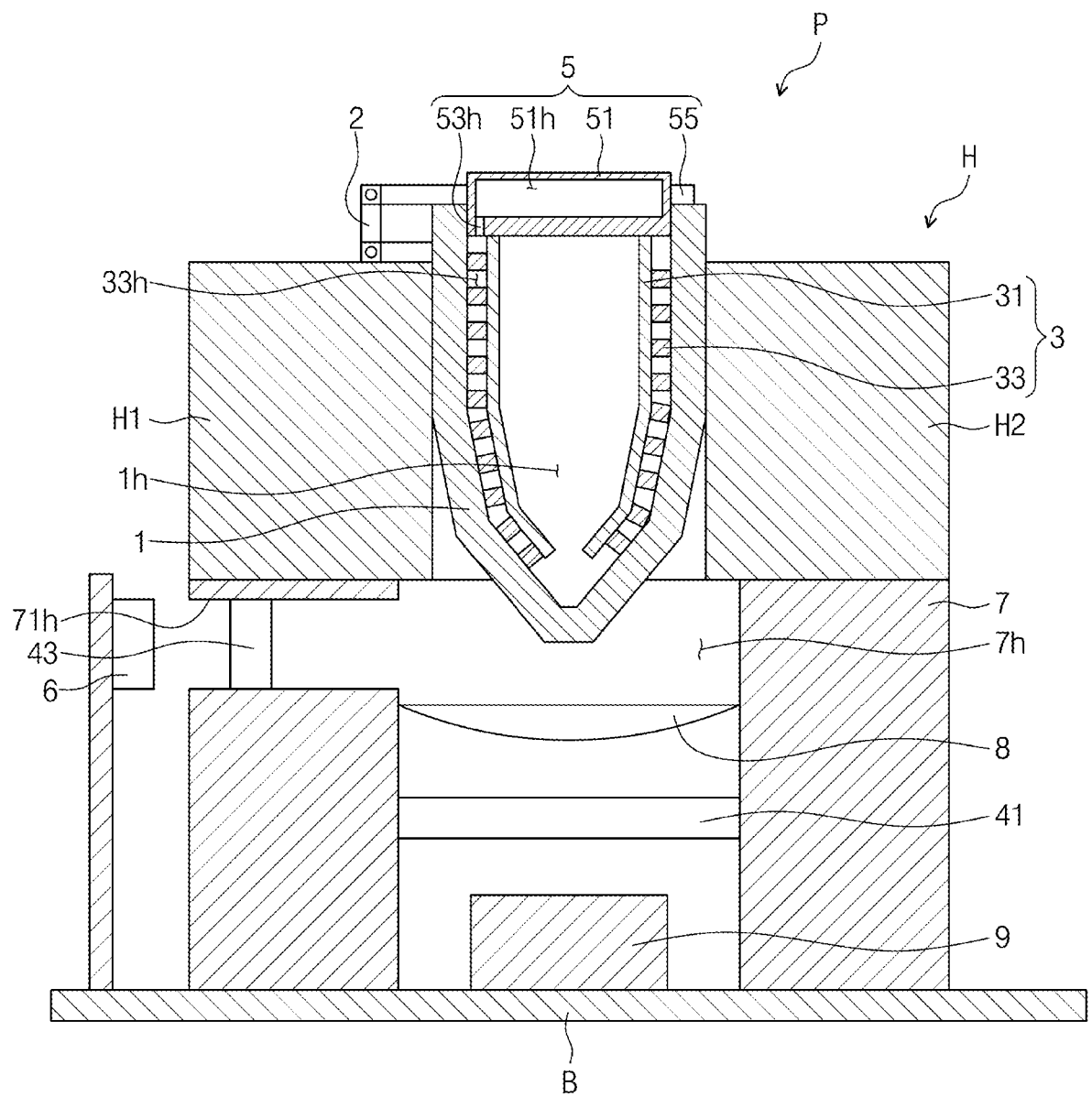
FIG. 10 is a cross-sectional view illustrating a state in which the PCR tube is disposed on a body tube according to an embodiment of the inventive concept.
Figure 11:
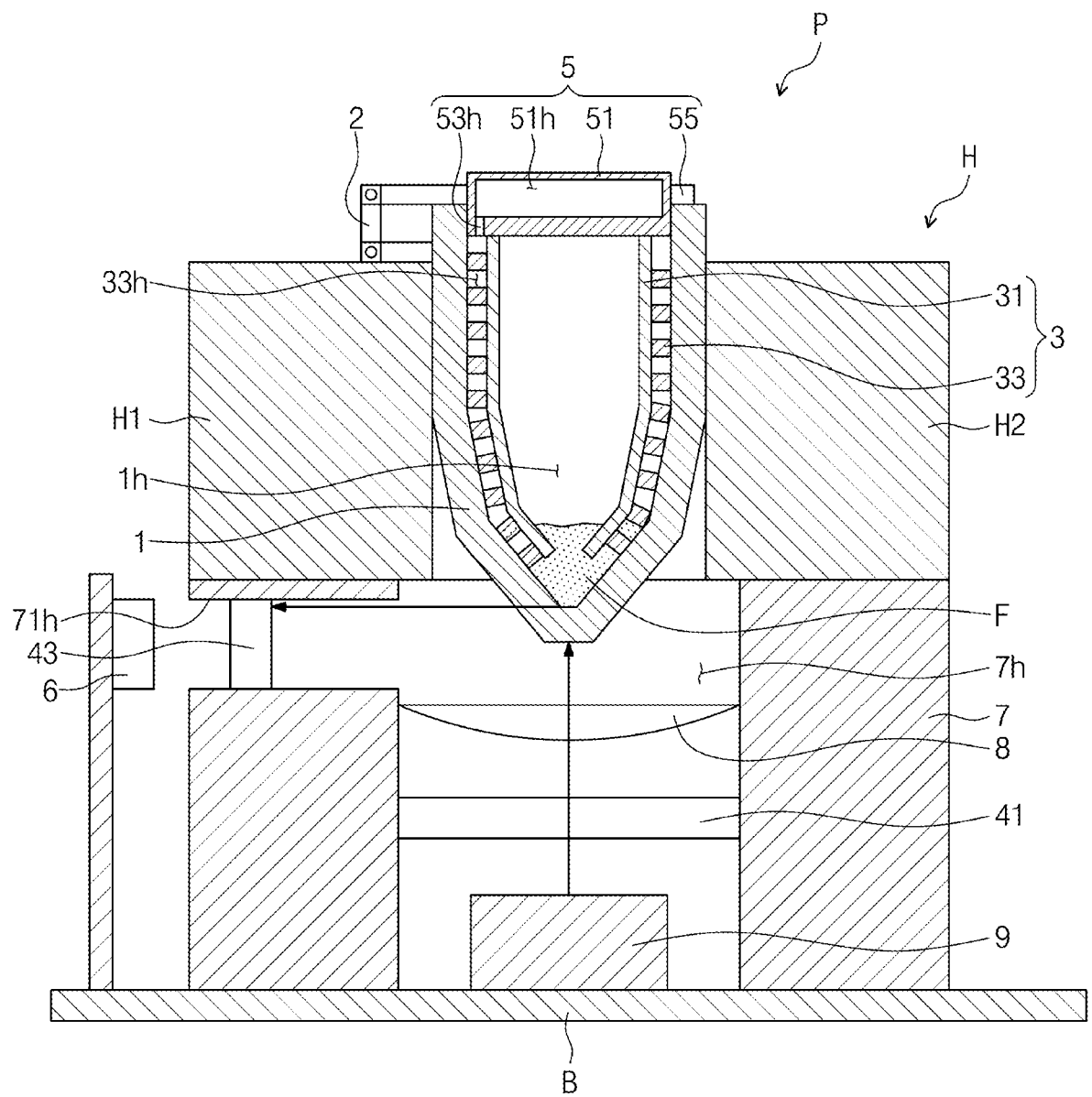
FIG. 11 is a cross-sectional view illustrating a state in which fluorescence measurement is performed after the PCR tube is disposed on the body tube according to an embodiment of the inventive concept.

FIG. 10 is a cross-sectional view illustrating a state in which the PCR tube is disposed on a body tube according to an embodiment of the inventive concept, and FIG. 11 is a cross-sectional view illustrating a state in which the fluorescence measurement is performed after the PCR tube is disposed on a body tube according to an embodiment of the inventive concept.

Referring to FIG. 10, the PCR apparatus may further include the fluorescence measuring device as stated above. The fluorescence measuring device may perform fluorescence measurement on the sample in the PCR tube P. The fluorescence measuring device may include a body tube 7, a light source 9, a light detection part 6, a lens 8, and an optical filter 41 and 43.

The body tube 7 may provide an observation space 7$h$. The observation space 7$h$ may vertically extend. For example, the observation space 7$h$ may vertically extend to pass through the body tube 7. The PCR tube P may be fixed onto the body tube 7. For example, the heater H is seated on a top surface of the body tube 7, and the PCR tube P inserted to the through-hole of the heater H may be disposed on the body tube 7. A lower portion of the PCR tube P may be disposed in the observation space 7$h$. The body tube 7 may include a cylindrical shape. That is, the body tube 7 may have a hollow cylinder shape. However, the embodiment of the inventive concept is not limited thereto. For example, the body tube 7 may include a different type configuration capable of fixing and seating the PCR tube P. The body tube 7 may be disposed on a support member B. That is, the body tube 7 may be supported by the flat plate shaped support member B. The body tube 7 may further provide an observation hole 71$h$. The observation hole 71$h$ may vertically extend. The observation hole 71$h$ may pass through a portion of a side surface of the body tube 7 and be connected to the observation space 7$h$. The observation space 7$h$ may be exposed to the light detection part 6 by the observation hole 71$h$.

The light source 9 may be disposed on the support member B. The light source may be positioned in the observation space 7$h$. The light source may be disposed in the observation space 7$h$. The light source 9 may emit light toward the PCR tube P. For example, the light source 9 may emit light toward the sample having the amplified DNA, which is gathered at the lower end of the PCR tube P. Although light irradiated by the light source 9 may include excited blue light, the embodiment of the inventive concept is not limited thereto. To this end, the light source 9 may include a LED lamp.

The light detection part 6 may detect light emitted from the observation space 7$h$ through the observation hole 71$h$. To this end, the light detection part 6 may include a photodiode and other electronic components.

The lens 8 may be disposed in the observation space 7$h$. More specifically, the lens 8 may be disposed above the light source 9. The lens 8 may concentrate light emitted from the light source 9 to the lower end of the PCR tube P. Although not shown, the lens may be provided in the observation hole 71$h$. The lens provided in the observation hole 71$h$ may concentrate light emitted from the sample to the light detection part 6.

The optical filter 41 and 43 may include a first optical filter 41 and a second optical filter 43. The first optical filter 41 may be disposed in the observation space 7$h$. More specifically, the first optical filter 41 may be disposed between the light source 9 and the lens 8. The first optical filter 41 may allow only light having a wavelength that is necessary to generate a fluorescence reaction among light emitted from the light source 9 to transmit therethrough. The second optical filter 43 may be disposed in the observation hole 71$h$. The second optical filter 43 may allow only light having a wavelength that is detected by the light detection part 6 among light emitted from the sample to transmit therethrough. Also, the first optical filter 41 and the second optical filter 43 may prevent the light emitted from the light source 9 from being directly transmitted to the light detection part 6.

Referring to FIGS. 11 and 4, in the process S5 of measuring the fluorescence of the sample flown along the micro-channel, light may be emitted from the light source 9 and irradiated to the sample F disposed at the lower end of the PCR tube P through the first optical filter 41 and the lens 8. When specific DNA exists in the sample F, the fluorescence reaction may be generated by irradiating light. Thus, when the specific DNA exists in the sample F, fluorescence may be emitted. The emitted fluorescence may pass through the second filter 43 and be detected by the light detection part 6. Thus, whether the specific DNA exists in the sample F may be determined.

The sample may be repeatedly heated with three temperature ranges while moving downward along the spiral micro-channel by the PCR tube, the PCR apparatus including the same, and the PCR method using the same according to an embodiment of the inventive concept. Thus, repeated DNA amplification may be performed. Also, the temperature of the sample may be precisely controlled through the first heater, the second heater, and the third heater, which are adjacent to the micro-channel.

The PCR may be performed by coupling only the inner tube having a simple structure into the outer tube that has already used by the PCR tube, the PCR apparatus including the same, and the PCR method using the same according to an embodiment of the inventive concept. Thus, an overall configuration may be simplified.

The fluorescence reaction on the sample that has undergone the DNA amplification may be induced by using the fluorescence measuring device instead of transferring the PCR tube by the PCR tube, the PCR apparatus including the same, and the PCR method using the same according to an embodiment of the inventive concept. Thus, the DNA amplification process and the fluorescence measurement may be performed by using one apparatus.

An efficiency of the DNA detection may be improved because the repeated amplification is possible by the PCR tube, the PCR apparatus including the same, and the PCR method using the same according to an embodiment of the inventive concept.

The temperature of the sample may be precisely controlled by the PCR tube, the PCR apparatus including the same, and the PCR method using the same according to an embodiment of the inventive concept.

The overall configuration may be simplified by the PCR tube, the PCR apparatus including the same, and the PCR method using the same according to an embodiment of the inventive concept.

The fluorescence measurement may be performed without transferring the tube by the PCR tube, the PCR apparatus including the same, and the PCR method using the same according to an embodiment of the inventive concept.

The efficiency of the DNA amplification may be improved by the PCR tube, the PCR apparatus including the same, and the PCR method using the same according to an embodiment of the inventive concept.

The object of the present invention is not limited to the aforesaid, but other objects not described herein will be clearly understood by those skilled in the art from descriptions below.

Although the embodiment of the present invention is described with reference to the accompanying drawings, those with ordinary skill in the technical field of the present invention pertains will be understood that the present invention can be carried out in other specific forms without changing the technical idea or essential features. Thus, the above-disclosed embodiments are to be considered illustrative and not restrictive.

What is claimed is:

1. A PCR tube comprising:
an outer tube configured to provide a first space having a blocked lower portion; and
an inner tube inserted to the first space,
wherein the inner tube comprises:
an inner tube body configured to provide a second space; and
a spiral structure protruding from a side surface of the inner tube body to the outside of the inner tube body,
wherein a micro-channel is defined by the outer tube, the inner tube body, and the spiral structure in a state in which the inner tube is inserted into the first space.

2. The PCR tube of claim 1, wherein as a lower portion of the inner tube body is opened, the first space and the second space are connected at the lower portion of the inner tube body.

3. The PCR tube of claim 1, further comprising a lid coupled onto the outer tube,
wherein the lid comprises:
a sample channel; and
an injection hole extending downward from the sample channel.

4. The PCR tube of claim 1, wherein each of the outer tube and the inner tube body has a shape that gradually decreases in a downward direction.

5. The PCR tube of claim 1, wherein the spiral structure protrudes by about 150 μm to about 250 μm from the side surface of the inner tube body to the outside of the inner tube body.

6. An apparatus for PCR, comprising:
a heater configure to provide a through-hole that vertically extends; and
a PCR tube inserted to the through-hole,
wherein the heater comprises a first heater, a second heater, and a third heater, and
the first heater, the second heater, and the third heater are arranged along a circumferential direction of the heater with respect to the through-hole,
wherein the PCR tube comprises:
an outer tube; and
an inner tube disposed inside the outer tube,
wherein a micro-channel extends downward with a spiral shape between the outer tube and the inner tube.

7. The apparatus of claim 6, wherein the PCR tube has a vertical length greater than that of the through-hole.

8. The apparatus of claim 7, further comprising:
a body tube configured to provide an observation space that vertically extends;
a light source configured to irradiate light to the observation space; and
a light detection part,
wherein the body tube further provides an observation hole that horizontally extends to be connected with the observation space,
the light detection part detects light emitted from the observation space through the observation hole, and
when the heater is seated on the body tube, a lower end of the PCR tube is inserted into the observation space.

9. The apparatus of claim 8, further comprising:
a lens disposed in the observation space; and
an optical filter disposed in the observation hole.

10. The apparatus of claim 6, wherein the inner tube comprises:
an inner tube body; and
a spiral structure protruding from a side surface of the inner tube body to the outside of the inner tube body,
wherein the micro-channel is defined by the outer tube, the inner tube body, and the spiral structure.

11. The apparatus of claim 10, wherein each of the outer tube and the inner tube body has a shape that gradually decreases in a downward direction.

12. A PCR method comprising:
filling a sample in a sample channel of a PCR tube;
allowing a sample to flow from the sample channel toward a micro-channel of the PCR tube; and
controlling a temperature of a heater that surrounds the PCR tube,
wherein the PCR tube comprises:
an outer tube; and
an inner tube disposed inside the outer tube
wherein the micro-channel extends downward with a spiral shape between the outer tube and the inner tube,
wherein the heater comprises a first heater, a second heater, and a third heater,
wherein the first heater, the second heater, and the third heater are arranged in a circumferential direction of the heater with respect to the PCR tube, and
wherein the controlling of the temperature of the heater that surrounds the PCR tube comprises:
controlling the first heater to have a first temperature;
controlling the second heater to have a second temperature; and
controlling the third heater to have a third temperature.

13. The PCR method of claim 12, further comprising allowing the PCR tube to rotate,
wherein the allowing of the PCR tube to rotate further comprises returning the sample flown downward along the micro-channel to the sample channel.

14. The PCR method of claim 12, further comprising measuring fluorescence of the sample flown downward along the micro-channel.

15. The PCR method of claim 14, wherein the measuring of the fluorescence of the sample flown downward along the micro-channel further comprises:
irradiating light to the sample flown downward along the micro-channel; and
detecting light emitted from the sample.

\* \* \* \* \*